US007814561B2

(12) United States Patent
Fried et al.

(10) Patent No.: US 7,814,561 B2
(45) Date of Patent: Oct. 12, 2010

(54) MANAGING DEVICE ACCESS IN A SOFTWARE PARTITION (75) Inventors: Eric P. Fried, Austin, TX (US); Perinkulam I. Ganesh, Round Rock, TX (US); Vinit Jain, Austin, TX (US); Lance W. Russell, Austin, TX (US); Srikanth Vishwanathan, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 188 days.

(21) Appl. No.: 12/128,250

(22) Filed: May 28, 2008

(65) Prior Publication Data
US 2008/0229431 A1 Sep. 18, 2008

Related U.S. Application Data (63) Continuation of application No. 11/420,978, filed on May 30, 2006, now abandoned.

(51) Int. Cl.
G06F 17/30 (2006.01)
(52) U.S. Cl. .................. 726/29; 726/21; 718/1; 718/100
(58) Field of Classification Search .................. 726/21, 726/29; 718/1, 100
See application file for complete search history.

(56) References Cited

U.S. PATENT DOCUMENTS

| 4,660,144 | A | * | 4/1987 | Walsh | 718/1 |
| 4,845,624 | A | * | 7/1989 | Clayton et al. | 707/8 |
| H1894 | H | | 10/2000 | Fletcher et al. | |
| 6,634,019 | B1 | * | 10/2003 | Rice et al. | 717/127 |
| 6,973,560 | B1 | * | 12/2005 | Rice et al. | 712/205 |
| 7,085,933 | B2 | * | 8/2006 | Challener et al. | 713/182 |
| 7,299,468 | B2 | * | 11/2007 | Casey et al. | 718/104 |
| 7,356,818 | B2 | * | 4/2008 | Carollo et al. | 718/102 |
| 7,415,582 | B2 | * | 8/2008 | Miki et al. | 711/154 |

(Continued)

OTHER PUBLICATIONS

"A Taste of Computer Security", http://www.kernelthread.com/publications/security/solaris.html, 7 pages, Feb. 2006.

(Continued)

*Primary Examiner*—Edan Orgad
*Assistant Examiner*—Bradley Holder
(74) *Attorney, Agent, or Firm*—Francis Lammes; Stephen J. Walder, Jr.; Matthew W. Baca (57) ABSTRACT A system and method to manage device access in a software partition are provided. The illustrative embodiments provide a mechanism for exporting resources/devices from an administrator partition to a software partition in its purview. A trusted device list data structure is provided that identifies which devices are permitted to be exported into a software partition from an administrative partition. This trusted device list data structure also identifies which of the devices in the list of devices should be exported by default when exporting devices to a software partition, i.e. if no overrides are specified. In addition, a user-specifiable mechanism to override the entries in the trusted device list data structure is provided. For security purposes, this mechanism may not be used to export devices not listed in the trusted device list data structure. The mechanism may also be used to prevent the exporting of devices which are exported by default.

18 Claims, 3 Drawing Sheets

U.S. PATENT DOCUMENTS

| | | | |
|---|---|---|---|
| 7,567,567 B2* | 7/2009 | Muller et al. | 370/392 |
| 2002/0108074 A1 | 8/2002 | Shimooka et al. | |
| 2003/0229802 A1* | 12/2003 | Challener et al. | 713/200 |
| 2004/0221290 A1 | 11/2004 | Casey et al. | |
| 2004/0267866 A1* | 12/2004 | Carollo et al. | 709/200 |
| 2005/0120242 A1* | 6/2005 | Mayer et al. | 713/201 |
| 2006/0025985 A1 | 2/2006 | Vinberg et al. | |
| 2006/0117130 A1 | 6/2006 | Tsushima et al. | |
| 2006/0221832 A1* | 10/2006 | Muller et al. | 370/235 |
| 2006/0288345 A1* | 12/2006 | Rice et al. | 718/1 |
| 2006/0294518 A1 | 12/2006 | Richmond et al. | |
| 2007/0006218 A1 | 1/2007 | Vinberg et al. | |
| 2007/0038819 A1* | 2/2007 | Miki et al. | 711/154 |
| 2007/0128899 A1* | 6/2007 | Mayer | 439/152 |

OTHER PUBLICATIONS

"System Administration Guide: Solaris Containers-Resource Management and Solaris Zones, Using the zonecfg Command to Modify a Zone Configuration", Sun Microsystems, Inc., http://docs.sun.com/app/docs/817-1592/6mhahuoos?a=view, 4 pages, Feb. 2006.

"System Administration Guide: Security Services, How to Change Which Devices Can Be Allocated", Sun Microsystems, Inc., http://docs.sun.com/app/docs/doc/816-4557/6maosrjdf?a=view, 2 pages, Feb. 2006.

"System Administration Guide: Security Services, Forcibly Allocating a Device", Sun Microsystems, Inc., http://docs.sun.com/app/docs/doc/816-4557/6maosrjdd?a=view, 2 pages, Feb. 2006.

"System Administration Guide: Security Services, Forcibly Deallocating a Device", Sun Microsystems, Inc., http://docs.sun.com/app/docs/816-4557/6maosrjde?a=view, 2 pages, Feb. 2006.

"BSD Jail as a Lightweight VM", http://www.softpanorama.org/VM/jails_as_lightweight_vm.shtml, 15 pages, Feb. 2006.

"Solaris Zones", http://www.softpanorama.org/Solaris/zones.shtml; 19 pages, Feb. 2006.

Kamp et al., "Building Systems to be Shared Securely", ACM Queue, vol. 2, No. 5, Jul./Aug. 2004, http://www.acmqueue.com/modules.php?name=Content&pa=showpage&pid=170, 4 pages.

* cited by examiner

MANAGING DEVICE ACCESS IN A SOFTWARE PARTITION

This application is a continuation of application Ser. No. 11/420,978, filed May 30, 2006, now abandoned.

BACKGROUND

1. Technical Field

The present application relates generally to an improved data processing system and method. More specifically, the present application is directed to a system and method to manage device access in a software partition.

2. Description of Related Art

As described by Poul-Henning Kamp in "Building Systems to be Shared Securely," ACM Queue, vol. 2, no. 5, July/August 2004, from the advent of multitasking, file-sharing, and virtual machines on desktop computing devices, to the use of large-scale sharing of server-class Internet Service Provider (ISP) hardware in collocation centers, the issue of safely sharing hardware between mutually untrusting parties has become of considerable concern. As a result, there has been a strong continuing interest in access control and separation technologies to support safe yet efficient sharing of computing systems.

One such access control and separation technology that has been receiving attention recently is generally referred to as software partitions. A software partition is a virtual instance of an operating system, i.e. a virtual system image, which runs using the same operating system kernel running in the host system. There may be multiple software partitions, i.e. virtual instances of an operating system, that share the operating system kernel, libraries, and the like, of the host system. Typically, with such software partitions, processes may not affect other processes or resources outside of the software partition. In this way, each software partition is isolated from every other software partition. However, the software partitions may share operating system resources and other system resources. Examples of software partitioning mechanisms include FreeBSD Jails™ and Solaris Zones/Containers™. More information about FreeBSD Jails™ may be found in "BSD Jail as a Lightweight VM". More information about Solaris Zones™ may be found in "Solaris Zones".

Software partitions allow multiple instances of an operating system to be spawned such that multiple applications may be provided using the same shared operating system and system resources. Thus, there are many potential uses of software partitioning. In particular, software partitions are frequently used in Internet Service Provider (ISP) environments to provide virtual "sand-boxes" that are isolated from one another such that the ISP host may be able to increase its service quality guarantee by offering each customer the guaranteed system resources, e.g., CPU, RAM, disk space, etc., in accordance with the customer's needs.

While software partitions, from a cursory viewpoint, seem similar to logical partitions, they are in fact quite different. A logical partition has its own operating system and resources that are allocated and dedicated to it and which are not accessible by other logical partitions. Thus, there is a strong isolation associated with logical partitions. On the other hand, software partitions have virtual instances of the same operating system and may share operating system and other system resources. Moreover, software partitions are much faster to configure, e.g., there is no need to lay down a new installation of most filesets, and easier to maintain, e.g., maintenance performed on the hosting system can be easily applied to the hosted software partitions. While there are mechanisms for isolating the virtual instances of the operating systems and the system resources associated with the software partition, these isolation mechanisms are not as strong as logical partitioning because the operating system and other system resources are not exclusively dedicated to the software partition, instead they are virtualized.

SUMMARY

When creating or maintaining a software partition, it is necessary to determine which devices should be made available within a partition. The term "devices" as used in the present description refers to device special files which may correspond to actual hardware devices, software mechanisms, file system constructs, or the like. Because software partitions are intended to be isolated, secure environments, it is important that they not have direct access to certain resources or devices, such as raw logical volumes, that may be shared by a plurality of software partitions. If such access were made available to a software partition, then processes in one software partition may be able to access data in the raw logical volumes that belong to another software partition and potentially corrupt that data.

However, it is also important that certain resources or devices be made available to the software partition in order to ensure proper operation of the processes in the software partition as well as the system as a whole. For example, it is important that a software partition have access to the null device, i.e. /dev/null, which is a device special file that discards all data written to it and provides no data to any process that reads from it, also referred to as a bit bucket or black hole. If a software partition did not have access to the null device, the root filesystem would quickly fill with garbage since garbage data would be written to files maintained by the filesystem rather than being discarded by the null device.

The illustrative embodiments described herein provide a mechanism for identifying which resources/devices should be made available to software partitions so as to ensure that those resources/devices that are needed by the software partition are made available while controlling access to resources/devices that are shared by multiple software partitions and may pose system integrity problems if made available to the software partitions. In particular, the illustrative embodiments provide a mechanism for exporting resources/devices (hereafter referred to simply as "devices") from an administrator partition to a software partition in its purview.

The illustrative embodiments provide a trusted device list data structure that identifies which devices are permitted to be exported into a software partition from an administrative partition. This trusted device list data structure also identifies which of the devices in the list of devices should be exported by default when exporting devices to a software partition, i.e. if no overrides are specified.

In addition to the trusted device list data structure, the illustrative embodiments provide a user-specifiable mechanism to override the entries in the trusted device list data structure. For security purposes, this mechanism may not be used to export devices not listed in the trusted device list data structure. The mechanism may only be used to export devices which are listed in the trusted device list data structure but are not exported by default. In addition, the mechanism may be used to prevent the exporting of devices which are exported by default. This allows the illustrative embodiments to be used in a two-tiered administration model whereby the higher authority has control over the devices that may be exported to a software partition, and the lower authority has control over the override mechanism.

The illustrative embodiments provide a software partition management mechanism, which may be implemented in hardware, software, or any combination of hardware and software, and which utilizes the trusted device list data structure and override mechanism to manage devices in software partitions. The software partition management mechanism manages the trusted device list data structure, exports devices to software partitions, duplicates the ownership and mode of the exported devices, provides the override mechanism described above, and performs other software partition management mechanisms in accordance with the methodologies described herein. In particular, the software partition management mechanism operates in an administrative partition and uses the trusted device list data structure and override mechanism to dynamically determine which devices are to be exported to software partitions and whether, according to current system situations, such devices are able to be exported to the software partitions.

The software partition management mechanism preferably includes functionality for performing checks of major/minor number, ownership, and permissions of each of the devices identified in the trusted device list data structure that are to be exported to the software partitions, as determined after application of any overrides via the override mechanism. If these checks result in a determination that a device is not to be accessible via a software partition, then the device is not exported to the software partition and an error message may be logged or returned to a requester of the device. If these checks result in a determination that the device is to be accessible via the software partition, then the device is exported by known mechanisms to the software partition.

With the trusted device list data structure and override mechanism of the illustrative embodiments, devices may be exported to software partitions in an "on-demand" or dynamic manner. That is, changes made in the administrative partition via the override mechanism are effectuated immediately in an active software partition. Thus, if the user uses the override mechanism to add devices to be exported to the software partition, or remove devices from being exported to the software partition, these overrides are effectuated immediately to export devices or remove access to devices from active software partitions.

In one illustrative embodiment, the trusted device list data structure may include, for one or more entries, a "legal number of instances" attribute that identifies how many copies of a particular device may be exported into software partitions. With this attribute, the software partition management mechanism may keep track of how many copies of a particular device have been exported into various partitions and denies subsequent exports when the "legal number of instances" limit is reached. As an example, a CD-ROM device may have a "legal number of instances" limit of 1, making its use exclusive to the software partition in which it currently resides. The on-demand override mechanism may be used from the administrative partition to "move" the device from one partition to another.

In addition to the above, the illustrative embodiments provide a mechanism, within the software partitions, by which a user or software partition administrator may request a device, such as by name and/or major/minor number (which, as is generally known in the art, are the numbers used by the operating system to identify an actual driver and device to be accessed by a user-level request), from the administrative partition. The software partition management mechanism may receive such requests from the users or administrators of the software partitions and make appropriate determinations as discussed above as to whether the requested device should be exported to the software partition. Based on the results of the decision, the requested device may then be exported to the software partition of the requester or an error message may be returned or logged indicating denial of the exporting of the requested device.

In one illustrative embodiment, a method for exporting a device to a software partition is provided. The method may comprise accessing a trusted devices data structure providing a first list of one or more devices that are permitted to be exported to a plurality of software partitions and accessing an override data structure providing a second list of one or more devices that are to be exported to the software partition. The method may further comprise exporting at least one device to the software partition based on the trusted devices data structure and the override data structure. The at least one device that is exported to the software partition may be at least one device that is identified in the trusted devices data structure and is not blocked from being exported to the software partition by an entry in the override data structure.

The trusted devices data structure may apply to all software partitions in the plurality of software partitions. The override data structure may apply to only a subset of the plurality of software partitions. Moreover, the trusted devices data structure may apply to all software partitions created by the data processing system while the override data structure is specific to and applies only to one software partition created by the data processing system.

The first list of one or more devices may identify at least one default device that is exported to the plurality of software partitions by default. The second list of one or more devices may include at least one device in the first list of one or more devices in addition to the at least one default device. The second list of one or more devices may block exportation of at least one of the default devices.

The devices in the second list of one or more devices may be a subset of the first list of one or more devices. Devices not listed in the first list of one or more devices may be prohibited from being present in the second list of one or more devices.

The method may further comprise performing one or more verification operations to determine if a user of the software partition is authorized to access a device that is determined to be intended for export to the software partition. The one or more verification operations may include at least one of a check of major/minor number associated with the device, a check of ownership of the device, or a check of permissions associated with the device.

The method may further comprise checking, for each device to be exported to the software partition as determined by the trusted device data structure and the override data structure, a legal number of instances attribute associated with the device that identifies how many copies of a particular device may be exported into software partitions. In one illustrative embodiment, exporting the at least one device may be performed for only those devices to be exported whose total current number of instances in software partitions is less than the legal number of instances attributes associated with those devices.

In other illustrative embodiments, a computer program product comprising a computer useable medium having a computer readable program is provided. The computer readable program, when executed on a computing device, causes the computing device to perform various ones, and combinations of, the operations outlined above with regard to the method illustrative embodiment.

In yet another illustrative embodiment, an apparatus is provided for exporting a device to a software partition. The apparatus may comprise a processor and a memory coupled to the processor. The memory may comprise instructions which, when executed by the processor, cause the processor to perform various ones, and combinations of, the operations outlined above with regard to the method illustrative embodiment.

These and other features and advantages of the present invention will be described in, or will become apparent to those of ordinary skill in the art in view of, the following detailed description of the exemplary embodiments of the present invention.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENTS

The illustrative embodiments provide mechanisms for managing devices exported to software partitions. As such, the mechanisms of the illustrative embodiments may be implemented in a stand-alone computing system or a distributed data processing system having a plurality of computing devices coupled to one another via one or more networks. Because software partitioning is especially well suited for use with servers in a distributed data processing system so as to provide separate virtual system images for use in providing applications to client devices, the illustrative embodiments will be described in terms of a distributed data processing system.

Figure 1:
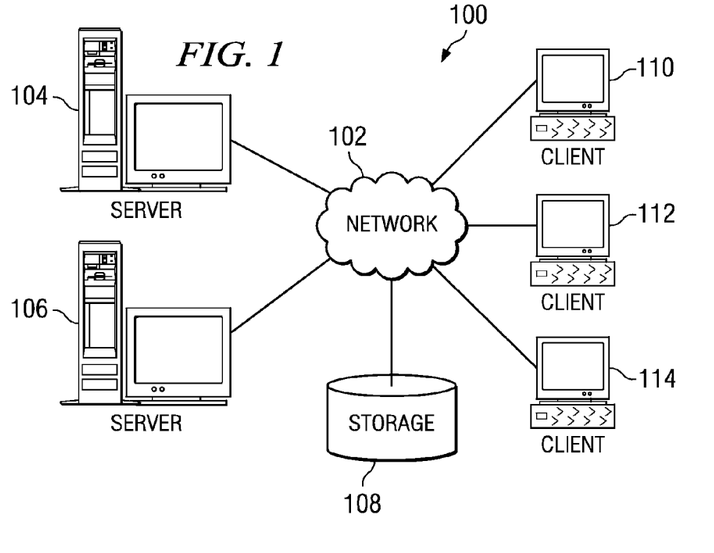
FIG. 1 depicts a pictorial representation of an exemplary distributed data processing system in which aspects of the illustrative embodiments may be implemented.
Figure 2:
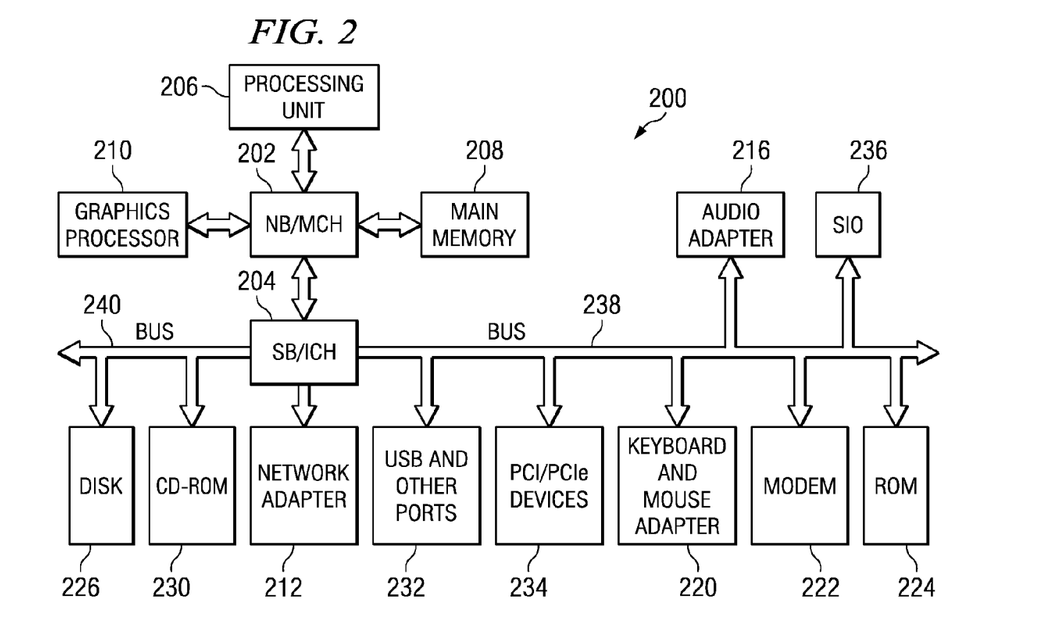
FIG. 2, a block diagram of a data processing system is shown in which aspects of the illustrative embodiments may be implemented.

FIGS. 1-2 provide an example of a distributed data processing system and computing devices that may be utilized with such a distributed data processing system. While the illustrative embodiments and FIGS. 1-2 will be described with regard to a distributed data processing system, it should be appreciated that the mechanisms of the illustrative embodiments may also be implemented in a stand-alone computing system without departing from the spirit and scope of the present invention.

With reference now to the figures and in particular with reference to FIGS. 1-2, exemplary diagrams of data processing environments are provided in which embodiments of the present invention may be implemented. It should be appreciated that FIGS. 1-2 are only exemplary and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of an exemplary distributed data processing system in which aspects of the illustrative embodiments may be implemented. Distributed data processing system 100 may include a network of computers in which embodiments of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as server 104 or client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ pSeries® computer system, running the Advanced Interactive Executive (AIX®) operating system or the LINUX® operating system (eServer, pSeries and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

With particular importance to the illustrative embodiments described herein, data processing system 200 is preferably a software partitioned data processing system in which the operating system running on data processing system 200 and virtual device resources of the data processing system 200 are shared by a plurality of software partitions which may each be running their own independent set of one or more applications. For example, the data processing system 200 may have a plurality of software partitions that each run independent Internet web sites, instances of a search engine, or the like. Importantly, the software partitions of the data processing system 200 share the operating system via virtual instances of the operating system and share the resources of the data processing system 200 through virtualized devices, but are independent and isolated from one another through software mechanisms in accordance with the illustrative embodiments described herein.

Software partitioning, in general, is known in the art. Mechanisms are provided in these generally known software partitioning systems, such as Solaris Containers™ and FreeBSD's Jails™, for establishing software partitions, exporting devices to software partitions, and the like. Therefore, a detailed explanation of these mechanisms will not be provided herein. The illustrative embodiments described herein are directed to mechanisms for identifying which resources/devices should be made available to software partitions so as to ensure that those resources/devices that are needed by the software partition are made available while controlling access to resources/devices that are shared by multiple software partitions and may pose system integrity problems if made available to the software partitions. In particular, the illustrative embodiments provide a mechanism for exporting resources/devices (hereafter referred to simply as "devices") from an administrator partition to a software partition in its purview. The illustrative embodiments may be implemented in a data processing system, such as data processing system 200, to export resources/devices to software partitions as part of the software partitioning process, e.g., the generation and management of software partitions running on the data processing system 200.

As described previously, the illustrative embodiments provide a trusted device list data structure that identifies which devices are permitted to be exported into a software partition from an administrative partition. This trusted device list data structure also identifies which of the devices in the list of devices should be exported by default when exporting devices to a software partition, i.e. if no overrides are specified.

In addition to the trusted device list data structure, the illustrative embodiments provide a user-specifiable mechanism to override the entries in the trusted device list data structure. For security purposes, this mechanism may not be used to export devices not listed in the trusted device list data structure. The mechanism may only be used to export devices listed in the trusted device list data structure but which are not exported by default. In addition, the mechanism may be used to prevent the exporting of devices which are exported by default. This allows the illustrative embodiments to be used in a two-tiered administration model whereby the higher authority has control over the devices that may be exported to a software partition, and the lower authority has control over the override mechanism.

The illustrative embodiments further provide a software partition management mechanism, which may be implemented in hardware, software, or any combination of hardware and software, and which utilizes the trusted device list data structure and override mechanism to manage devices in software partitions. The software partition management mechanism manages the trusted device list data structure, exports devices to software partitions, duplicates the ownership and mode of the exported devices, provides the override mechanism described above, and performs other software partition management mechanisms in accordance with the methodologies described herein. In particular, the software partition management mechanism operates in an administrative partition and uses the trusted device list data structure and override mechanism to dynamically determine which devices are to be exported to software partitions and whether, according to current system situations, such devices are able to be exported to the software partitions.

The software partition management mechanism preferably includes functionality for performing checks of major/minor number, ownership, and permissions of each of the devices identified in the trusted device list data structure that are to be exported to the software partitions, as determined after application of any overrides via the override mechanism. If these checks result in a determination that a device is not to be accessible via a software partition, then the device is not exported to the software partition and an error message may be logged or returned to a requester of the device. If these checks result in a determination that the device is to be accessible via the software partition, then the device is exported by known mechanisms to the software partition.

With the trusted device list data structure and override mechanism of the illustrative embodiments, devices may be exported to software partitions in an "on-demand" or dynamic manner. That is, changes made in the administrative partition via the override mechanism are effectuated immediately in an active software partition. Thus, if the user uses the override mechanism to add devices to be exported to the software partition, or remove devices from being exported to the software partition, these overrides are effectuated immediately to export devices or remove access to devices from active software partitions.

In one illustrative embodiment, the trusted device list data structure may include, for one or more entries, a "legal number of instances" attribute that identifies how many copies of a particular device may be exported into software partitions. With this attribute, the software partition management mechanism may keep track of how many copies of a particular device have been exported into various partitions and denies subsequent exports when the "legal number of instances" limit is reached. As an example, a CD-ROM device may have a "legal number of instances" limit of 1, making its use exclusive to the software partition in which it currently resides. The on-demand override mechanism may be used from the administrative partition to "move" the device from one partition to another.

In addition to the above, the illustrative embodiments provide a mechanism, within the software partitions, by which a user or software partition administrator may request a device, such as by name and/or major/minor number (which, as is generally known in the art, are the numbers used by the operating system to identify an actual driver and device to be accessed by a user-level request), from the administrative partition. The software partition management mechanism may receive such requests from the users or administrators of the software partitions and make appropriate determinations as discussed above as to whether the requested device should be exported to the software partition. Based on the results of the decision, the requested device may then be exported to the software partition of the requester or an error message may be returned or logged indicating denial of the exporting of the requested device.

Figure 3:
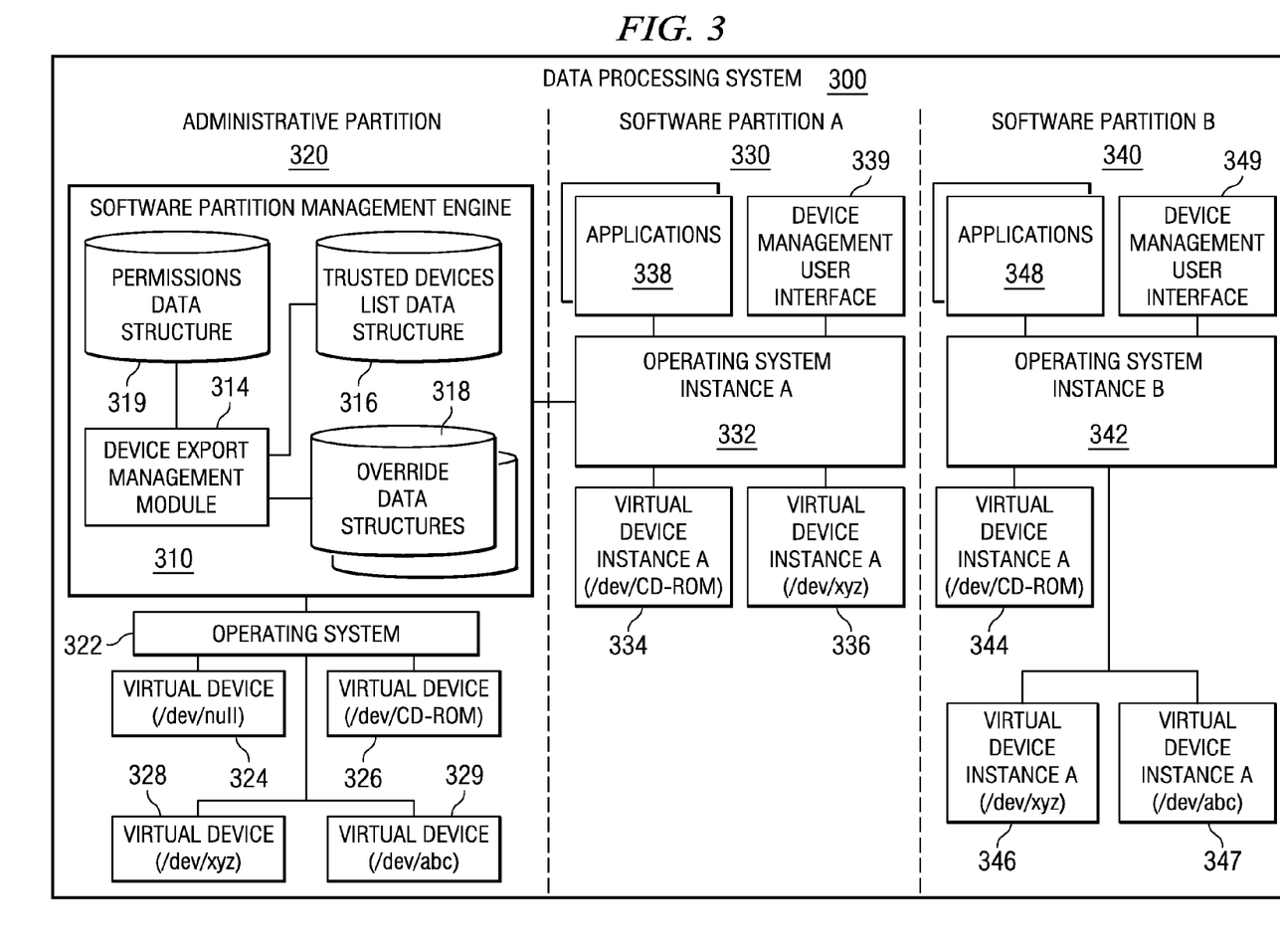
FIG. 3 is an exemplary block diagram illustrating the primary operational components of a software partition management system in accordance with one illustrative embodiment.

FIG. 3 is an exemplary block diagram illustrating the primary operational components of a software partition management system in accordance with one illustrative embodiment. As shown in FIG. 3, a software partition management engine 310 is provided in an administrative partition 320 of a data processing system 300. Also provided in the administrative partition 320 are an operating system 322 and a plurality of virtual devices 324-329 which, as stated above, may be associated with hardware or software devices, constructs, or the like. The software partition management engine 310 is responsible for the generation and management of software partitions within the data processing system 300. While software partition management engine 310 will be described in terms of the software partition management engine 310 generating and managing software partitions on the same data processing system 300 in which it is operating, it should be appreciated that the software partition management engine 310 may also be used to generate and manage software partitions on other data processing systems that are external to the data processing system 300 in which the software partition management engine 310 operates, without departing from the spirit and scope of the present invention.

The software partition management engine 310 generates software partitions 330 and 340 in response to a user or system administrator request to generate a new software partition. Such a request may be provided to the software partition management engine 310 via a user interface (not shown), for example. The software partition management engine 310, in response to a request to generate a software partition, generates a virtual instance 332, 342 of the operating system 322 for the software partition 330, 340 as well as performs other operations generally known in the art for generating a software partition. These other operations may include, for example, creating filesystems, populating filesystems by performing root-part installation, establishing network configurations, establishing resource controls, and creating a restricted environment in the operating system kernel.

In addition, the software partition management engine 310, in accordance with the illustrative embodiments herein, includes a device export management module 314 that determines which of the virtual devices 324-329 should be exported to the generated software partition. The device export management module 314 contains logic which operates on a trusted device list data structure 316 to determine which devices have been approved by the system administrator or user for exportation to software partitions, such as software partitions 330, 340. The device export management module 314 further contains logic for operating on user override data structures 318 for determining which software partitions 330, 340 have overrides associated with them for overriding or modifying the settings of the trusted device list data structure 316 with regard to the devices that are exported to those particular software partitions 330, 340.

Based on the results of the operation of this logic in the device export management module 314, the software partition management engine 310 may determine what devices 324-329 should be exported to each of the particular software partitions 330, 340. The software management module 310 may then use known export mechanisms for exporting the selected devices to the software partitions 330, 340 to thereby generate device instances 334-336 and 344-347, for example. In this way, the devices that are approved for exporting to software partitions may be controlled by a system administrator or other person of authority, while overrides of default device exportation may be controlled by a user of the software partition.

The trusted device list data structure 316 is preferably generated and maintained by a system administrator or other person of authority over the operation of the data processing system 300. The trusted device list data structure 316 applies globally to all software partitions generated and maintained by the software partition management engine 310. Within the trusted device list data structure 316 are entries for each of the devices, such as devices 324-329, which may be exported to software partitions, such as software partitions 330 and 340. Each entry may further identify whether or not the associated device is to be exported to software partitions in a default manner. That is, those devices that are to be exported by default to software partitions will be exported to every software partition 330, 340 generated and maintained by the software partition management engine 310 unless there is a user override blocking the device from being exported to the software partition.

The entries in the trusted device list data structure 316 may further identify a "legal number of instances" of the corresponding device that may be in use at a same time within software partitions of the data processing system 300. A further field in the entries may keep track of a current number of instances of the corresponding device that are being utilized in the data processing system 300. Thus, if the current number of instances for a device is equal to the legal number of instances for that device, no more instances of that device will be allowed to be exported by the software partition management engine 310 to new or existing software partitions until one or more of the software partitions release their instance of that device.

In addition to the trusted devices list data structure 316, each software partition may have its own override data structure 318 that contains user specified overrides of the default exportation of devices specified in the trusted devices list data structure 316. Essentially, the override data structure 318 specifies which of the devices that are exported by default by the software partition management engine 310, the user or operator of the applications 338, 348 in the software partition 330, 340 does not want exported to their software partition.

Moreover, the override data structure 318 further specifies which devices in the trusted devices list data structure 316, that are not exported by default, the user or operator of the applications 338, 348 of the software partition 330, 340 wants exported to their software partition. Since those devices listed in the trusted device list data structure 316 which are not identified as default exportation devices are not to be provided to all software partitions automatically, it is important, in one illustrative embodiment, to check permissions associated with such devices to ensure that the user/operator of the applications 338, 348 of the software partitions 330, 340 is permitted to access the devices. The device export management module 314 may access a permissions data structure 319 and perform a lookup based on an identifier of the software partition and/or user/operator of the applications in the software partition, to determine if access to the device should be granted to that software partition. The determination as to whether access should be granted to a device may be performed based on major/minor numbers of the device, ownership information, permissions associated with the device, and the like as provided by the permissions data structure 319, as well as characteristics of the user/operator and the software partition requesting access to the devices. If access to the device is denied, an error message or log entry may be generated and returned to the software partition management engine 310.

The device export management module 314 of the software partition management engine 310 uses both the trusted device list and override data structures 316 and 318 to determine, for each software partition 330, 340 that is generated and maintained by the software partition management engine 310, which devices 324-329 should be exported to each of the software partitions 330, 340. Only those devices that are listed in the trusted devices list data structure 316 are eligible for exportation to software partitions. In one illustrative embodiment, the override data structure 318 is generated by providing the trusted devices list data structure 316 to a user/operator of applications in a software partition, e.g., software partition 330, via a device management user interface 339 through which the user/operator may edit the listing to specify which devices he/she wishes the software partition 330 to have access to. The resulting edited trusted devices list data structure 316 is then used to generate the override data structure 318 and provide this override data structure 318 to the software partition management engine 310. Therefore, since the override data structure 318 is generated from the trusted devices list data structure 316, it cannot reference devices that are not present within the trusted devices list data structure.

The user/operator of the applications in the software partition 330 is preferably limited as to the edits he/she may do to the trusted devices list data structure 316 to thereby generate the override data structure 318. For example, the user/operator may be limited to only selecting or de-selecting which of the devices he/she wishes to be exported to the software partition 310. Thus, the legal number of instances field associated with the devices in the trusted devices list data structure 316 may not be modified by the user/operator of the software partition 330. This field is only modifiable by a system administrator or person of authority over the data processing system 300 as a whole.

With these data structures 316 and 318, it can be seen that the logic of the device export management module 314 causes only devices that are listed in the trusted devices list data structure 316, are not indicated as being blocked from exportation by the user or operator of applications in the software partition via the override data structure 318, are devices for which the user/operator of the applications in the software partition has permission to access, and are devices which have available instances to be generated by the software partition management engine 310, to be exported by the software partition management engine 310 to a software partition 330. Those devices that are listed in the trusted devices list data structure 316, but are not indicated as being default exportation devices, or are indicated as being default exportation devices but the user has overridden the default exportation, and are not indicated by the override data structure 318 as being desired by the user/operator of the software partition to be exported to the software partition, are not exported to the software partition. Moreover, those devices that are indicated by the data structures 316 and 318 as being exportable to the software partition, but are not accessible by the user/operation of the software partition because he/she does not have adequate permissions, are also not exported to the software partition.

From the decisions made by the device export management module 314, a list of devices that are to be exported to the software partition may be generated. The software partition management engine 310 may then export these devices to the software partition using known exportation mechanisms. For example, since the devices are device special files representative of hardware devices, software, file system constructs, etc., that are entries in a filesystem, "exporting" a device may consist of creating an exact duplicate of the device special file in the target filesystem of the software partition.

In known systems, block, character, and pipe special files represent devices and such files are created using the mknod( ) subroutine. The mknod( ) subrouting may also be used to set permission masks. Ownership of the exported devices may be adjusted using the chown( ) subroutine, which is generally known in the art.

It should be noted that while the exportation of devices has been described above with regard to exportation at the time that the software partition is generated, such device exportation may be performed in a dynamic manner while software partitions are being managed by the software partition management engine 310. For example, a user/operation of a software partition 330 may access the override data structure 318 for that software partition 330 via the device management user interface 339 after establishment of the software partition 330. The user/operator may make changes to the override data structure 318 and may then submit those changes to the software partition management engine 310. The software partition management engine 310 may then operate on the modified override data structure 318 and the trusted devices list data structure 316 to thereby determine which devices the software partition 330 should now have access to. Those devices that are not presently accessible by the software partition 330, and for which the user/operator has sufficient permissions and instances are still available, may then be exported to the software partition 330. Those device instances that are presently accessible by the software partition 330, but should no longer be accessible by the software partition 330 as determined from the modified override data structure 318, are torn down by the device export management module 314 of the software partition management engine 310.

As the device export management module 314 exports devices, tears down device instances, and the software partitions release device instances, the software partition management engine 310 updates the current instances field of the corresponding entries in the trusted devices list data structure 316. Thus, this data structure is dynamically updated as changes to device allocations to software partitions occur.

As described above, it can be seen that the illustrative embodiments provide mechanisms for determining access to devices by software partitions and for exporting devices to such software partitions. The mechanisms of the illustrative embodiments allow a system administrator or other person of authority to have global control over the devices that are permitted to be exported to software partitions in general. The mechanisms of the illustrative embodiments further allow individual software partition users/operators to have control of the particular ones of the trusted devices specified by the global authority that are to be exported to their individual software partition.

Figure 4:
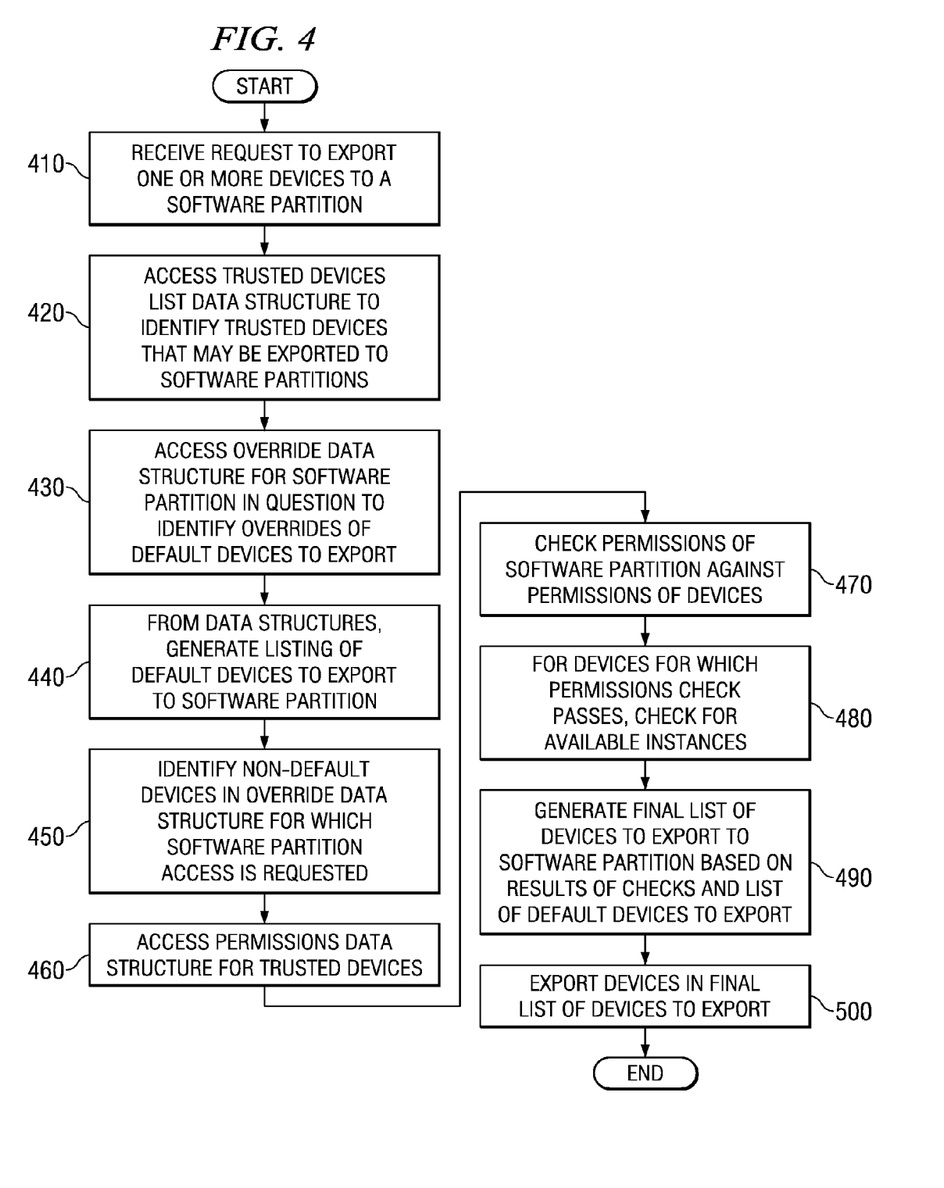
FIG. 4 is a flowchart outlining an exemplary operation for exporting a device to a software partition in accordance with one illustrative embodiment.

FIG. 4 is a flowchart outlining an exemplary operation for exporting a device to a software partition in accordance with one illustrative embodiment. It will be understood that each block of the flowchart illustration, and combinations of blocks in the flowchart illustration, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustration support combinations of means for performing the specified functions, combinations of steps for performing the specified functions and program instruction means for performing the specified functions. It will also be understood that each block of the flowchart illustration, and combinations of blocks in the flowchart illustration, can be implemented by special purpose hardware-based computer systems which perform the specified functions or steps, or by combinations of special purpose hardware and computer instructions.

As shown in FIG. 4, the operation starts by the software partition management engine receiving a request to export one or more devices to a software partition (step 410). This request may be a request initiated by a user/operator of the software partition, a request generated as part of a software partition generation operation, a request that is automatically performed when an update to an override data structure is performed, or the like, for example.

The device export management module of the software partition management engine accesses the trusted devices list data structure to identify those trusted devices that are to be exported by default to the software partition (step 420). The device export management module also accesses the override data structure for the software partition in question to identify overrides of the defaults specified in the trusted devices list data structure (step 430). From these data structures, the device export management module generates a listing of default devices to export to the software partition (step 440).

The device export management module further identifies those devices specified in the override data structure that are requested to be exported to the software partition but are not default devices to export to the software partition (step 450). The device export management module accesses a permissions data structure for the trusted devices (step 460) and checks the permissions associated with the software partition against the permissions of the devices for which access is requested by the software partition (step 470). For those devices for which the software partition has associated permissions, a check is made to determine if there are available instances of those devices that may be generated (step 480).

Those devices for which the software partition has associated permissions and for which there are available instances are added to the listing of default devices to export to the software partition to thereby generate a final list of devices to export to the software partition (step 490). For those devices for which the software partition does not have appropriate permissions, error messages and log entries may be generated and returned to the software partition management module. Such error messages and log entries may be used to notify system administrators and/or user/operators of the software partitions as to problems with access requests to certain devices.

The device export management module then provides the final listing of devices to export to the software partition management module which exports the devices listed in the final listing of device to export (step 500). The operation then terminates. This process may be repeated for each software partition and for each request that is generated.

Thus, the illustrative embodiments provide mechanisms for determining what virtual devices are to be exported to software partitions. The illustrative embodiments further provide mechanisms for dynamically exporting devices and removing device access to/from software partitions. Moreover, the illustrative embodiments provide mechanisms for limiting the number of instances of a device that are allowed to be made available to software partitions as well as which software partitions are able to access particular devices based on established permissions.

It should be appreciated that the illustrative embodiments described above may take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the illustrative embodiments may take the form of a computer program product accessible from a computer-usable or computer-readable medium providing program code for use by or in connection with a computer or any instruction execution system. For the purposes of this description, a computer-usable or computer readable medium may be any apparatus that may contain, store, communicate, propagate, or transport the program for use by or in connection with the instruction execution system, apparatus, or device.

The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

As described previously above, a data processing system suitable for storing and/or executing program code will include at least one processor coupled directly or indirectly to memory elements through a system bus. The memory elements may include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) may be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

The invention claimed is:

1. A method, in a software partitioned data processing system, for exporting a device from an administrator partition to a software partition, comprising:

accessing, by a device export management module in a software partition management engine of the administrator partition, a trusted devices data structure providing a first list of one or more devices that are permitted to be exported to a plurality of software partitions, wherein the first list of one or more devices identifies at set of default devices that are to be exported to the plurality of software partitions by default and wherein the set of default devices is a subset of the one or more devices that are permitted to be exported to the plurality of software partitions;

presenting, by a device management user interface in the software partition, the first list to a user of the software partition, responsive to a selection made by the user via the device management user interface, generating, by the device export management module, an override data structure for the software partition, wherein the override data structure identifies a second list of at least one default device in the subset of default devices that is blocked from being exported and at least one permitted device in the one or more devices that are permitted to be exported that is not in the set of default devices;
and exporting, by the device export management module, at least one default device in the subset of default devices that is not blocked and the least one permitted device to the software partition based on the first list in the trusted devices data structure and the second list in the override data structure.

2. The method of claim 1, wherein the trusted devices data structure applies to all software partitions in the plurality of software partitions.

3. The method of claim 1, wherein the override data structure applies to only a subset of the plurality of software partitions.

4. The method of claim 1, wherein the trusted devices data structure applies to all software partitions in the plurality of software partitions created by the software partitioned data processing system, wherein the override data structure comprises a plurality of override data structures, and where each override data structure is specific to and applies only to one software partition in the plurality of software partitions created by the software partitioned data processing system.

5. The method of claim 1, wherein the devices in the second list of one or more devices are a subset of the first list of one or more devices, and wherein devices not listed in the first list of one or more devices are prohibited from being present in the second list of one or more devices.

6. The method of claim 1, further comprising:
performing one or more verification operations to determine if a user of the software partition is authorized to access a device that is determined to be intended for export to the software partition.

7. The method of claim 6, wherein the one or more verification operations include at least one of a check of major/minor number associated with the device, a check of ownership of the device, or a check of permissions associated with the device.

8. The method of claim 1, further comprising:
checking, for each device to be exported to the software partition as determined by the trusted device data structure and the override data structure, a legal number of instances attribute associated with the device that identifies how many copies of a particular device may be exported into software partitions, wherein exporting the at least one device is performed for only those devices to be exported whose total current number of instances in software partitions is less than the legal number of instances attributes associated with those devices.

9. A computer program product comprising a non-transitory computer readable storage medium having a computer readable program recorded thereon, wherein the computer readable program, when executed on a computing device, causes the computing device to:

access a trusted devices data structure providing a first list of one or more devices that are permitted to be exported to a plurality of software partitions, wherein the first list of one or more devices identifies at set of default devices that are to be exported to the plurality of software partitions by default and wherein the set of default devices is a subset of the one or more devices that are permitted to be exported to the plurality of software partitions;

present the first list to a user of the software partition;

responsive to a selection made by the user via the device management user interface, generate an override data structure for the software partition, wherein the override data structure identifies a second list of at least one default device in the subset of default devices that is blocked from being exported and at least one permitted device in the one or more devices that are permitted to be exported that is not in the set of default devices; and export at least one default device in the subset of default devices that is not blocked and the least one permitted device to the software partition based on the first list in the trusted devices data structure and the second list in the override data structure.

10. The computer program product of claim 9, wherein the trusted devices data structure applies to all software partitions in the plurality of software partitions wherein the override data structure comprises a plurality of override data structures, and wherein each override data structure is specific to and applies only to one software partition in the plurality of software partitions.

11. The computer program product of claim 9, wherein the devices in the second list of one or more devices are a subset of the first list of one or more devices, and wherein devices not listed in the first list of one or more devices are prohibited from being present in the second list of one or more devices.

12. The computer program product of claim 9, wherein the computer readable program further causes the computing device to:

perform one or more verification operations to determine if a user of the software partition is authorized to access a device that is determined to be intended for export to the software partition.

13. The computer program product of claim 9, wherein the computer readable program further causes the computing device to:

check, for each device to be exported to the software partition as determined by the trusted device data structure and the override data structure, a legal number of instances attribute associated with the device that identifies how many copies of a particular device may be exported into software partitions, wherein exporting the at least one device is performed for only those devices to be exported whose total current number of instances in software partitions is less than the legal number of instances attributes associated with those devices.

14. A system for exporting a device to a software partition, comprising:

a processor; and a memory coupled to the processor, wherein the memory contains instructions which, when executed by the processor, cause the processor to:

access a trusted devices data structure providing a first list of one or more devices that are permitted to be exported to a plurality of software partitions, wherein the first list of one or more devices identifies at set of default devices that are to be exported to the plurality of software partitions by default and wherein the set of default devices is a subset of the one or more devices that are permitted to be exported to the plurality of software partitions;

present the first list to a user of the software partition;

responsive to a selection made by the user via the device management user interface, generate an override data structure for the software partition, wherein the override data structure identifies a second list of at least one default device in the subset of default devices that is blocked from being exported and at least one permitted device in the one or more devices that are permitted to be exported that is not in the set of default devices; and export at least one default device in the subset of default devices that is not blocked and the least one permitted device to the software partition based on the first list in the trusted devices data structure and the second list in the override data structure.

15. The system of claim 14, wherein the trusted devices data structure applies to all software partitions in the plurality of software partitions, wherein the override data structure comprises a plurality of override data structures, and wherein each override data structure is specific to and applies only to one software partition in the plurality of software partitions.

16. The system of claim 14, wherein the devices in the second list of one or more devices are a subset of the first list of one or more devices, and wherein devices not listed in the first list of one or more devices are prohibited from being present in the second list of one or more devices.

17. The system of claim 14, wherein the instructions further cause the processor to:

perform one or more verification operations to determine if a user of the software partition is authorized to access a device that is determined to be intended for export to the software partition.

18. The system of claim 14, wherein the instructions further cause the processor to:

check, for each device to be exported to the software partition as determined by the trusted device data structure and the override data structure, a legal number of instances attribute associated with the device that identifies how many copies of a particular device may be exported into software partitions, wherein exporting the at least one device is performed for only those devices to be exported whose total current number of instances in software partitions is less than the legal number of instances attributes associated with those devices.

\* \* \* \* \*